United States Patent [19]

Olschewski et al.

[11] Patent Number: 4,762,207
[45] Date of Patent: Aug. 9, 1988

[54] AUTOMATIC ADJUSTMENT ARRANGEMENT FOR DISK BRAKES

[75] Inventors: Armin Olschewski, Schweinfurt; Manfred Brandenstein, Eussenheim; Horst-Manfred Ernst, Eltingshausen; Robert Stolz; Günter Neder, both of Schweinfurt, all of Fed. Rep. of Germany

[73] Assignee: SKF GmbH, Schweinfurt, Fed. Rep. of Germany

[21] Appl. No.: 70,366

[22] Filed: Jul. 7, 1987

[30] Foreign Application Priority Data

Jul. 15, 1986 [DE] Fed. Rep. of Germany ....... 3623790

[51] Int. Cl.$^4$ .................. F16D 65/38; F16D 55/02
[52] U.S. Cl. ................. 188/196 D; 188/71.9; 188/196 V
[58] Field of Search ............... 188/71.8, 71.9, 196 D, 188/196 V, 196 P, 202, 79.5 K, 79.5 GE, 79.5 GC; 192/111 A; 92/13

[56] References Cited

U.S. PATENT DOCUMENTS 3,952,845  4/1976  Asquith ................. 188/196 D

FOREIGN PATENT DOCUMENTS 3336120  4/1985  Fed. Rep. of Germany .

Primary Examiner—Andres Kashnikow
Assistant Examiner—Robert J. Oberleitner
Attorney, Agent, or Firm—Rosen, Dainow & Jacobs

[57] ABSTRACT

An automatic adjustment arrangement for disk brakes has a flanged threaded nut and a threaded spindle threadedly coupled thereto arranged between the brake piston and the hand brake piston. The flange of the threaded nut is axially form-locked and radially displaceable relative to the brake piston. The threaded spindle is rotatably supported in a rolling bearing which is radially displaceable. The hand brake piston and threaded spindle are frictionally coupled. The extension of the adjustment member is produced by rotation of the threaded spindle. To avoid malfunctions, an automatic centering of the entire adjustment element relative to the brake piston as well as relative to the housing is provided. Manufacturing and assembly errors are thereby compensated for. The positions of the threaded spindle and threaded nut can be interchanged.

6 Claims, 1 Drawing Sheet

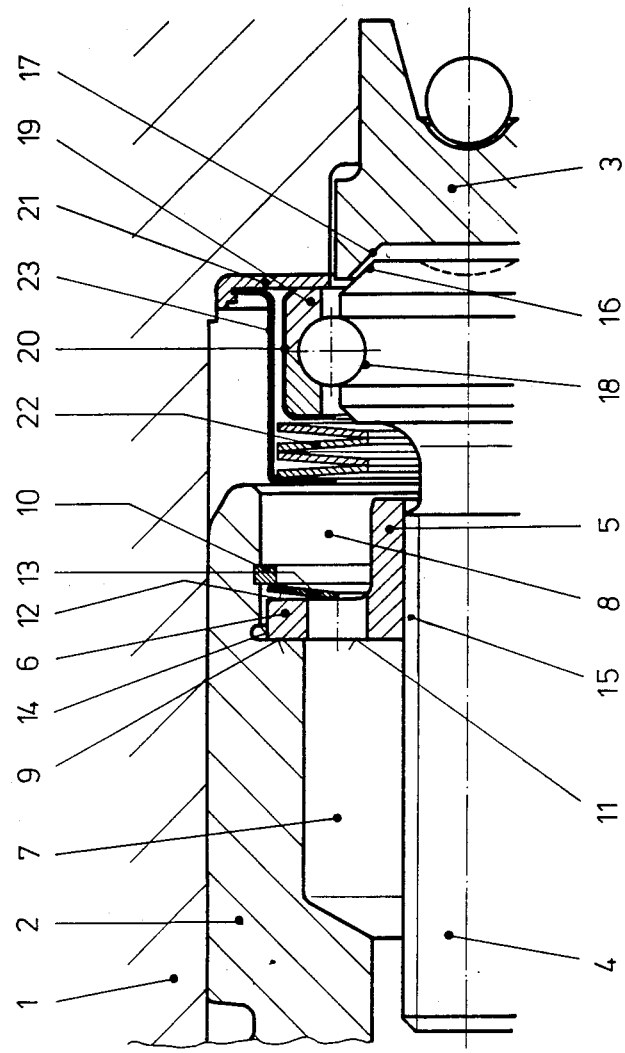

AUTOMATIC ADJUSTMENT ARRANGEMENT FOR DISK BRAKES

FIELD OF THE INVENTION

This invention relates to an adjustment arrangement for disk brakes.

BACKGROUND OF THE INVENTION

An adjustment arrangement of this type is disclosed in DE-OS No. 3336120. This discloses an adjustment member arranged between the brake piston and the hand brake piston, when a wear-dependent removal of material from the braking surfaces occurs, so that the hand brake application as well as the hydraulically actuated foot brake remain unchanged with the necessary play provided. Both pistons are coaxially disposed in a housing. The adjustment member comprises a threaded spindle and a threaded nut, whereby these form a frictional coupling with the hand brake piston by way of a conical surface, for example, in order that a mutual shortening of the coupling between the threaded spindle and the threaded nut during application of the hand brake is precluded. Upon application of the hydraulic foot brake a lengthening of the coupling is possible by rotation of the threaded nut, because the aforementioned frictional coupling is not engaged. The rolling bearing and the spring facilitate the rotational motion. Upon application of the hand brake, the adjustment member is radially fixed, on the one hand, by the automatically centered frictional coupling and, on the other hand, by the threaded spindle pressed securely in the base of the brake piston. In order that the rolling bearing arranged approximately in the center will in this way not be radially deformed, the outer ring is fixed, with the possibility of radial adjustment, between a surface attached to the housing and a spring. Depending upon the manufacturing tolerances or errors in assembly, in particular upon pressing of the threaded spindle in the brake piston, a large radial deformation of the threaded spindle can occur upon engagement of the frictional coupling, whereby also disadvantageous effects on the thread or on the sliding surface of brake piston can be anticipated. The same situation arises if conversely the threaded nut is connected to the piston and the frictional coupling is arranged on the threaded spindle.

SUMMARY OF THE INVENTION

The object of the invention is to provide an adjustment arrangement of the above-discussed type wherein offset due to manufacturing tolerances and assembly errors have no adverse effect on operability.

This object is realized by providing an adjustment element coupled to the brake piston which is arranged to be axially form-locked and radially displaceable relative to the brake piston. By these measures the adjustment element, whether it is the threaded spindle or in the converse arrangement the threaded nut, can be radially adjusted relative to the brake piston. For this reason the radial position of the entire adjustment member, including the rolling bearing, is determined solely by the conical surface of the frictional coupling. The radial adjustment results from the frictional restraint in the area of the brake piston as well as in the area of the rolling bearing easily and completely automatically upon application of the hand brake. A further advantage results also with respect to the function of the frictional coupling: the conical surfaces are again centered upon each application and produce for that reason no radial displacement of the adjustment member on account of the symmetrical contact of the circumferences. This results in a reliable protection against torsion if the relatively large diameters of the conical surface already ensure a high frictional force. Further, smooth movement of the threads over a long operational lifetime is assured. Because torsional forces on the brake piston in the housing are no longer acting, the sliding surfaces are preserved and a stable responsive brake application is achieved.

In accordance with a further feature of the invention, the adjustment element connected to the brake piston abuts a stop face of the brake piston in the direction of the braking force, and in the opposite direction is connected to the brake piston by way of an axially prestressed spring and is radially displaceable relative thereto. The spring can be a spring washer and/or this adjustment element is provided with a radial flange. The flange surface facing in the direction of the braking force is thrust against the radial surface connecting a pot-shaped bore and a bore having greater diameter. The other flange surface is positioned by the spring washer which presses against a retaining ring inserted in a recess in the bore surface. The adjustment element can take the form of a threaded nut. It is additionally advantageous if the rolling bearing is arranged on the threaded spindle at a small distance from the frictional coupling.

The aforementioned features produce, especially if combined, a very advantageous preferred embodiment of the invention. The threaded nut inserted in the brake piston is provided with an axially relatively short thread. The brake piston has a relatively short offset bore which is connected to the conventional pot-shaped bore by an annular radial surface. The threaded nut is provided with a flange which abuts this radial surface. On the other side, the flange is held in the brake piston by a spring washer and a retaining ring. The diameter of the flange is smaller than that of the offset bore, so that a radial displacement of the threaded nut under frictional restraint is possible. The threaded nut arranged in the brake piston leaves enough free space for introduction of the threaded spindle in the brake piston. The rolling bearing adjoining the frictional coupling can be especially precisely radially adjusted under the centering forces produced from the conical surfaces. In this manner also a small overall height of the inventive adjustment arrangement is achieved.

BRIEF DESCRIPTION OF THE DRAWING

The preferred embodiment of the invention will be described in detail hereinafter with reference to the drawing, which shows a partially sectioned view of the preferred embodiment.

DETAILED DESCRIPTION OF THE PREFERRED EMBODIMENT

The FIGURE shows a partial longitudinal section of an automatic adjustment arrangement for disk brakes in accordance with the invention. The arrangement comprises a housing 1 having a cylindrical space for (among other things) a hydraulically actuated brake piston 2. Along the same axis, but in a bore having a smaller diameter, an axially displaceable and mechanically actuated hand brake piston 3 is arranged. Between this and the brake piston 2, an axially extending adjustment member 4, 5 is arranged, whereby an axial force can be transmitted to the brake piston 2 by mechanical actuation of the hand brake piston 3. The adjustment member comprises a threaded spindle 4 and a threaded nut 5, which is coupled with the brake piston 2 by form-locking of a flange 6 formed on the nut 5. The brake piston 2 is for that purpose provided with bore 8 which communicates with the pot-shaped bore 7, the former having a diameter greater than that of the latter. The bore 8 joins the pot-shaped bore 7 by way of an annular radial surface 9. A circumferential groove for receiving a locking ring 10 is incorporated in the surface of bore 8. The front surface 11 of flange 6 abuts against the radial surface 9. An axially prestressed spring washer 13 is inserted between the rear surface 12 of the flange 6 and the locking ring 10. The outer circumferential surface 14 of the flange 6 has a diameter which is somewhat smaller than that of bore 8, so that the threaded nut 5 can radially slide against the brake piston 2 under the frictional loading produced by spring washer 13.

The threaded spindle 4, which is turned in the threaded nut 5 by means of a self-locking-free thread 15 of large pitch, has a conical surface 16 on its end nearest to the hand brake piston 3. This conical surface 16 forms a frictional coupling with a corresponding conical bore surface 17 incorporated in the hand brake piston 3, which frictional coupling impedes turning of the threaded spindle 4 when the hand brake piston 3 is actuated. The inner raceway 18 for a ball bearing is incorporated in the outer circumferential surface connected to the conical surface 16, at which place the threaded spindle has an increased diameter. The outer ring 19 comprises two halves which are held together by means of an outer sleeve 20. Outer sleeve 20 is restrained between ring 21 fixed to housing 1 and a stack of spring washers 22. The stack of spring washers 22 is supported by the base of a pot-shaped sleeve 23, which is connected at its other end to the housing 1 by way of ring 21. The inner diameter of the pot-shaped sleeve 23 is somewhat larger than the outer diameter of the outer sleeve 20 of the ball bearing, so that the ball bearing can be radially displaced under the frictional resistance applied by the spring washers 22. This operation occurs, for example, upon application of the hand brake, when the frictional coupling 16, 17 is engaged. During this phase the threaded nut 5 also adjusts radially relative to the brake piston 2, so that the entire adjustment member 4, 5 is displaced in the alignment direction. For each braking operation, whereby the brake piston 2 in the depicted arrangement is displaced to the left, the threaded spindle will be more or less axially displaced therewith depending on the force of the brake application. At the same time the outer ring 19 has its contact surface on the side facing the housing lifted off of the ring 21 in opposition to the compression exerted by spring washers 22. Because of the large pitch of the self-locking-free thread 15 and the restoring force of the spring washers 22, the threaded spindle 4 is shifted by rotation in the sense of an extension relative to the threaded nut 5. Thereby is the adjustment operation terminated. A restored centering results, in case of necessity, upon the next application of the hand brake.

The preferred embodiment of the adjustment arrangement according to the invention is only an example. Alternatively, it is possible to provide the reverse arrangement of the threaded nut and threaded spindle, whereby the radially displaceable arrangement of the rolling bearing in the brake piston and the corresponding radial displaceability of the threaded nut relative to the housing are also possible and the same advantage is realized.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In an automatic adjustment arrangement for disk brakes, comprising:
   (a) a housing having first and second bores in communication, said first and second bores being substantially coaxial;
   (b) a brake piston axially slidably arranged in said first bore of said housing and having a substantially cylindrical sliding surface;
   (c) a manually actuated hand brake piston axially slidably arranged in said second bore of said housing and having a substantially cylindrical sliding surface;
   (d) first and second adjustment elements connected to each other by a self-locking-free thread to form an extendable adjustment member arranged between said brake piston and said hand brake piston; and
   (e) a rolling bearing axially urged toward a radial surface of said housing by a first spring means;
   wherein said first adjustment element has a first conical surface and said hand brake piston has a second conical surface, said first and second conical surfaces forming a frictional coupling for mechanically actuating said first adjustment element, and said second adjustment element is coupled to said brake piston, and wherein said first adjustment element is rotatably mounted in said rolling bearing, said rolling bearing being slightly radially displaceable,
   the improvement wherein said second adjustment element is axially form-locked and radially displaceable with respect to said brake piston.

2. The adjustment arrangement as defined in claim 1, wherein said second adjustment element has a first surface facing the direction of brake application which abuts a substantially radial stop surface formed on said brake piston and a second surface facing the opposite direction which is contacted by a second spring means, said second spring means being axially fixed with respect to said brake piston and urging said second adjustment element toward said stop face.

3. The adjustment arrangement as defined in claim 2, wherein said second spring means comprises a spring washer.

4. The adjustment arrangement as defined in claim 2, wherein said second adjustment element comprises a substantially radially directed flange, said first and second surfaces of said second adjustment element being formed on said flange, and wherein said brake piston has a pot-shaped bore and a bore for receiving said second adjustment element communicating therewith, said pot-shaped bore and said bore for receiving said second adjustment element having said radial stop surface arranged therebetween, said bore for receiving said second adjustment element having a diameter greater than that of said pot-shaped bore and a circumferential groove for receiving a retaining ring, said second spring means being arranged to abut said retaining ring and said second surface of said flange.

5. The adjustment arrangement as defined in claim 2, wherein said first adjustment element comprises a threaded spindle and said second adjustment element comprises a threaded nut.

6. The adjustment arrangement as defined in claim 5, wherein said rolling bearing is arranged on said threaded spindle a short distance from said frictional coupling.

* * * * *